US009351256B2

(12) United States Patent
Kim

(10) Patent No.: US 9,351,256 B2
(45) Date of Patent: May 24, 2016

(54) MOBILE TERMINAL AND CONTROL METHOD THEREOF

(75) Inventor: Jonghwan Kim, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 13/346,642

(22) Filed: Jan. 9, 2012

(65) Prior Publication Data

US 2012/0295672 A1 Nov. 22, 2012

(30) Foreign Application Priority Data

May 19, 2011 (KR) .................. 10-2011-0047545

(51) Int. Cl.
*H04B 1/38* (2015.01)
*H04W 52/02* (2009.01)
*H04M 1/2745* (2006.01)

(52) U.S. Cl.
CPC ........ *H04W 52/0261* (2013.01); *H04M 1/2745* (2013.01); *Y02B 60/50* (2013.01)

(58) Field of Classification Search
CPC .......................... H04W 52/02; H04W 52/0216
USPC .................................................. 455/573, 574
See application file for complete search history.

(56) References Cited

U.S. PATENT DOCUMENTS

| 6,314,308 | B1 * | 11/2001 | Sheynblat et al. ............ 455/574 |
| 6,408,196 | B2 * | 6/2002 | Sheynblat et al. ............ 455/574 |
| 6,668,179 | B2 * | 12/2003 | Jiang .............................. 455/572 |
| 7,518,337 | B2 * | 4/2009 | Beart et al. .................... 320/108 |
| 7,925,909 | B1 * | 4/2011 | Craine .......................... 713/320 |
| 2005/0239477 | A1 * | 10/2005 | Kim et al. ................. 455/456.1 |
| 2007/0266106 | A1 | 11/2007 | Kato |
| 2007/0287509 | A1 * | 12/2007 | Izumi et al. .................. 455/573 |
| 2008/0020803 | A1 * | 1/2008 | Rios et al. ..................... 455/565 |
| 2008/0057894 | A1 * | 3/2008 | Aleksic et al. ............. 455/187.1 |
| 2009/0156268 | A1 * | 6/2009 | Kim et al. ..................... 455/573 |
| 2010/0302980 | A1 * | 12/2010 | Ji et al. .......................... 370/311 |

FOREIGN PATENT DOCUMENTS

GB          2426670 A   * 11/2006   ............... G06F 1/32

OTHER PUBLICATIONS

European Patent Office Application Serial No. 12001033.5, Search Report dated Mar. 21, 2016, 8 pages.

* cited by examiner

*Primary Examiner* — Wesley Kim
*Assistant Examiner* — Richard Chan
(74) *Attorney, Agent, or Firm* — Lee, Hong, Degerman, Kang & Waimey; Jonathan Kang; Richard Salfelder

(57) ABSTRACT

The present invention relates to a mobile terminal and control method thereof capable of managing power consumption. The mobile terminal according to an embodiment of the present invention may include a battery unit configured to supply power to an electronic element mounted on a terminal body, a measurement unit configured to measure a battery remaining amount for the battery unit, and a controller configured to set a battery assigned amount for the battery unit to a designated contact address, and implement a limited mode according to a result of comparing the battery remaining amount with the battery to assigned amount, and limit a function based on information on the contact addresses other than the designated contact address when the limited mode is implemented.

13 Claims, 16 Drawing Sheets

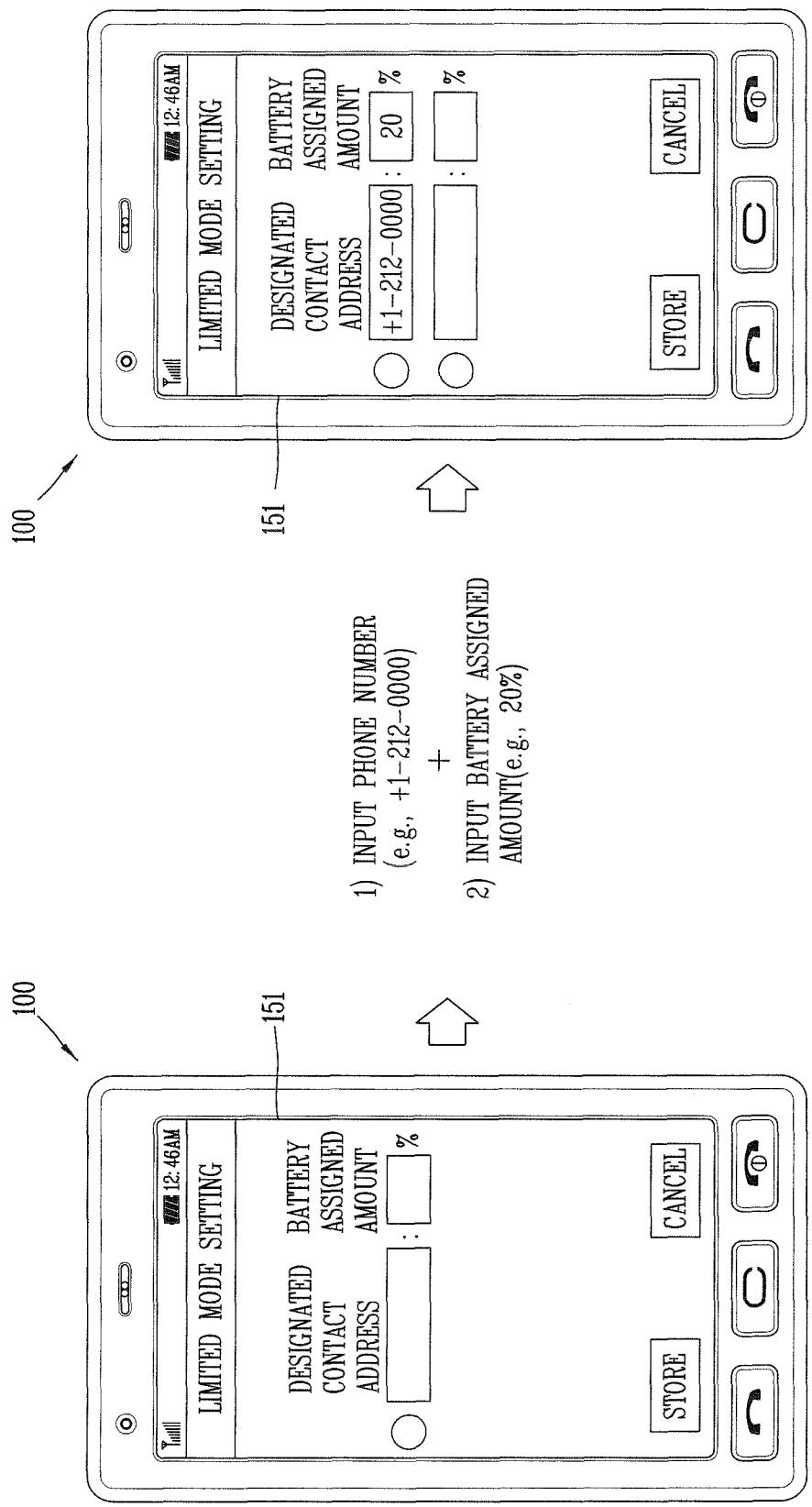

MOBILE TERMINAL AND CONTROL METHOD THEREOF

RELATED APPLICATION

Pursuant to 35 U.S.C. §119(a), this application claims the benefit of earlier filing date and right of priority to Korean Application No. 10-2011-0047545, filed on May 19, 2011, the contents of which is incorporated by reference herein in its entirety.

BACKGROUND OF THE INVENTION

1. Field of the Invention

The present disclosure relates to a mobile terminal, and more particularly, to a mobile terminal and control method thereof capable of managing power consumption.

2. Description of the Related Art

Terminals can be classified into a mobile terminal and a stationary terminal based on its mobility. Furthermore, terminals can be further classified into a handheld terminal and a vehicle mount terminal based on whether or not the terminal can be directly carried by a user.

As it becomes multifunctional, the mobile terminal can capture still or moving images, play music or video files, play games, receive broadcast and the like, so as to be implemented as an integrated multimedia player. Moreover, in order to support and enhance the function of the terminal, improvements of the terminal may be considered in the aspect of structure or software.

On the other hand, the amount of battery consumption has been rapidly increased via enhancing the performance of a terminal. However, the user wants to use a terminal for a longer time in addition to the enhanced performance of the terminal. Accordingly, studies on the enhancement of battery efficiency and the reduction of battery consumption continue to be carried out.

SUMMARY OF THE INVENTION

An object of the present invention is to provide a mobile terminal and control method thereof capable of controlling power consumption based on information on a designated contact address.

Another object of the present invention is to provide a mobile terminal and control method thereof capable of notifying the power status of the mobile terminal to a designated contact address, and conveniently implementing a function based on information on a designated contact address when implementing a power saving mode.

A mobile terminal according to an embodiment of the present invention may include a battery unit configured to supply power to an electronic element mounted on a terminal body, a measurement unit configured to measure a battery remaining amount for the battery unit, and a controller configured to set a battery assigned amount for the battery unit to a designated contact address, and implement a limited mode according to a result of comparing the battery remaining amount with the battery assigned amount, and limit a function based on information on the other contact addresses other than the designated contact address when the limited mode is carried out.

The mobile terminal may further include a communication unit configured to transmit notification information on the limited mode to at least one of a terminal corresponding to the designated contact address, a social network service (SNS) server, and a base station when the limited mode is carried out.

According to an embodiment, the notification information may include at least one of battery status information, reply information, and location information. Furthermore, the reply information may include at least one of a phone number of a calling terminal providing the notification information, contact address information corresponding to an adjacent terminal of the calling terminal, an address of the social network service server and authentication information for accessing the social network service server.

According to an embodiment, the communication unit may receive the location information of a wireless charging region from a wireless power transmission device corresponding to the wireless charging region when the wireless charging region is found in the limited mode.

The mobile terminal may further include a display unit configured to display the location information of the wireless charging region received in the limited mode. Furthermore, the mobile terminal may further include a power receiver configured to detect the wireless charging region and receive wireless power from the wireless power transmission device, and a charging unit configured to charge the battery unit using the wireless power.

The mobile terminal may further include a display unit configured to display a menu window for implementing a function based on information on the designated contact address when the limited mode is implemented. The display unit may display notification information on the limited mode when the limited mode is implemented.

According to an embodiment, the controller may block communication with the other contact addresses when the limited mode is implemented. Furthermore, the controller may allow a remote control operation requested from a terminal corresponding to the designated contact address when the limited mode is implemented. Furthermore, the designated contact address may include emergency contact addresses specified by each country.

The mobile terminal may further include a first user identity module configured to store first user information, and a second user identity module configured to store second user information.

According to an embodiment, the controller may set a battery assigned amount for the battery unit to contact addresses corresponding to the first and the second user information, respectively.

According to an embodiment, the controller may generate a pop-up window for asking whether to implement the limited mode when the battery remaining amount is less than the battery assigned amount in when an application is executed.

The controller may maintain the execution of the application and implement the limited mode when an execution command is received by using the pop-up window, and the application is based on the designated contact address. The controller may terminate the execution of the application and implement the limited mode when an execution command is received by using the pop-up window, and the application is not based on the designated contact address. The controller may maintain the execution of the application and block the implementation of limited mode when a rejection command is received by using the pop-up window.

A mobile terminal according to another embodiment of the present invention may include a battery unit configured to supply power to an electronic element mounted on a terminal body, a measurement unit configured to measure a battery remaining amount for the battery unit, and a controller configured to set a first and a second battery assigned amount for the battery unit to a first and a second contact address, respectively, and implement a limited mode according to a result of comparing the battery remaining amount with a reference value, and select at least one of the first and the second contact address based on the battery remaining amount when the limited mode is carried out, and limit a function based on information on the other contact addresses other than the selected contact address. Here, the reference value may be a sum of the first and the second battery assigned amount.

According to an embodiment, the controller may select the first and the second contact address when the battery remaining amount is greater than the first battery assigned amount in the limited mode, and select the first contact address when the battery remaining amount is less than or equal to the first battery assigned amount.

According to an embodiment, the controller may select the second contact address when the battery remaining amount is greater than the first battery assigned amount in the limited mode, and select the first contact address when the battery remaining amount is less than or equal to the first battery assigned amount.

According to an embodiment, the reference value may be determined as the first battery assigned amount when the first battery assigned amount is greater than the second battery assigned amount. At this time, the controller may select the first and the second contact address when the battery remaining amount is greater than the second battery assigned amount in the limited mode, and select the first contact address when the battery remaining amount is less than or equal to the second battery assigned amount. Furthermore, the controller may select the second contact address when the battery remaining amount is greater than the second battery assigned amount in the limited mode, and select the first contact address when the battery remaining amount is less than or equal to the second battery assigned amount.

According to an embodiment, at least one of the first and the second contact address may be a contact address group containing information on a plurality of contact addresses.

A method of operating a mobile terminal according to an embodiment of the present invention may include measuring a battery remaining amount for the battery unit, setting a battery assigned amount for the battery unit to a designated contact address, implementing a limited mode according to a result of comparing the battery remaining amount with the battery assigned amount, and limiting a function based on information on the other contact addresses other than the designated contact address when the limited mode is implemented.

The control method of a mobile terminal may further include transmitting notification information on the limited mode to at least one of the designated contact address, a social network service (SNS) server, and a base station when the limited mode is implemented.

Furthermore, the control method of a mobile terminal may further include displaying a menu window for implementing a function based on information on the designated contact address when the limited mode is implemented.

According to an embodiment, in the step of limiting a function, communication with the other contact addresses may be blocked.

The control method of a mobile terminal may further include receiving the location information of a wireless charging region from a wireless power transmission device corresponding to the wireless charging region when the wireless charging region is found in the limited mode, and displaying the location information of the wireless charging region.

A method of operating a mobile terminal according to an embodiment of the present invention may include measuring a battery remaining amount for the battery unit, setting a first and a second battery assigned amount for the battery unit to a first and a second contact address, respectively, implementing a limited mode according to a result of comparing the battery remaining amount with a reference value, and selecting at least one of the first and the second contact address based on the battery remaining amount when the limited mode is implemented, and limiting a function based on information on the other contact addresses other than the selected contact address. Here, the reference value may be a sum of the first and the second battery assigned amount.

According to an embodiment, in the step of limiting a function, the first and the second contact address may be selected when the battery remaining amount is greater than the first battery assigned amount in the limited mode, and the first contact address may be selected when the battery remaining amount is less than or equal to the first battery assigned amount.

According to an embodiment, in the step of limiting a function, the second contact address may be selected when the battery remaining amount is greater than the first battery assigned amount in the limited mode, and the first contact address may be selected when the battery remaining amount is less than or equal to the first battery assigned amount.

According to an embodiment, the reference value may be determined as the first battery assigned amount when the first battery assigned amount is greater than the second battery assigned amount. In the step of limiting a function, the first and the second contact address may be selected when the battery remaining amount is greater than the second battery assigned amount in the limited mode, and the first contact address may be selected when the battery remaining amount is less than or equal to the second battery assigned amount. Furthermore, in the step of limiting a function, the second contact address may be selected when the battery remaining amount is greater than the second battery assigned amount in the limited mode, and the first contact address may be selected when the battery remaining amount is less than or equal to the second battery assigned amount.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6 through 8 are conceptual views illustrating a process of implementing a limited mode according to the embodiments of the present invention;

DETAILED DESCRIPTION OF THE INVENTION

Figure 1:
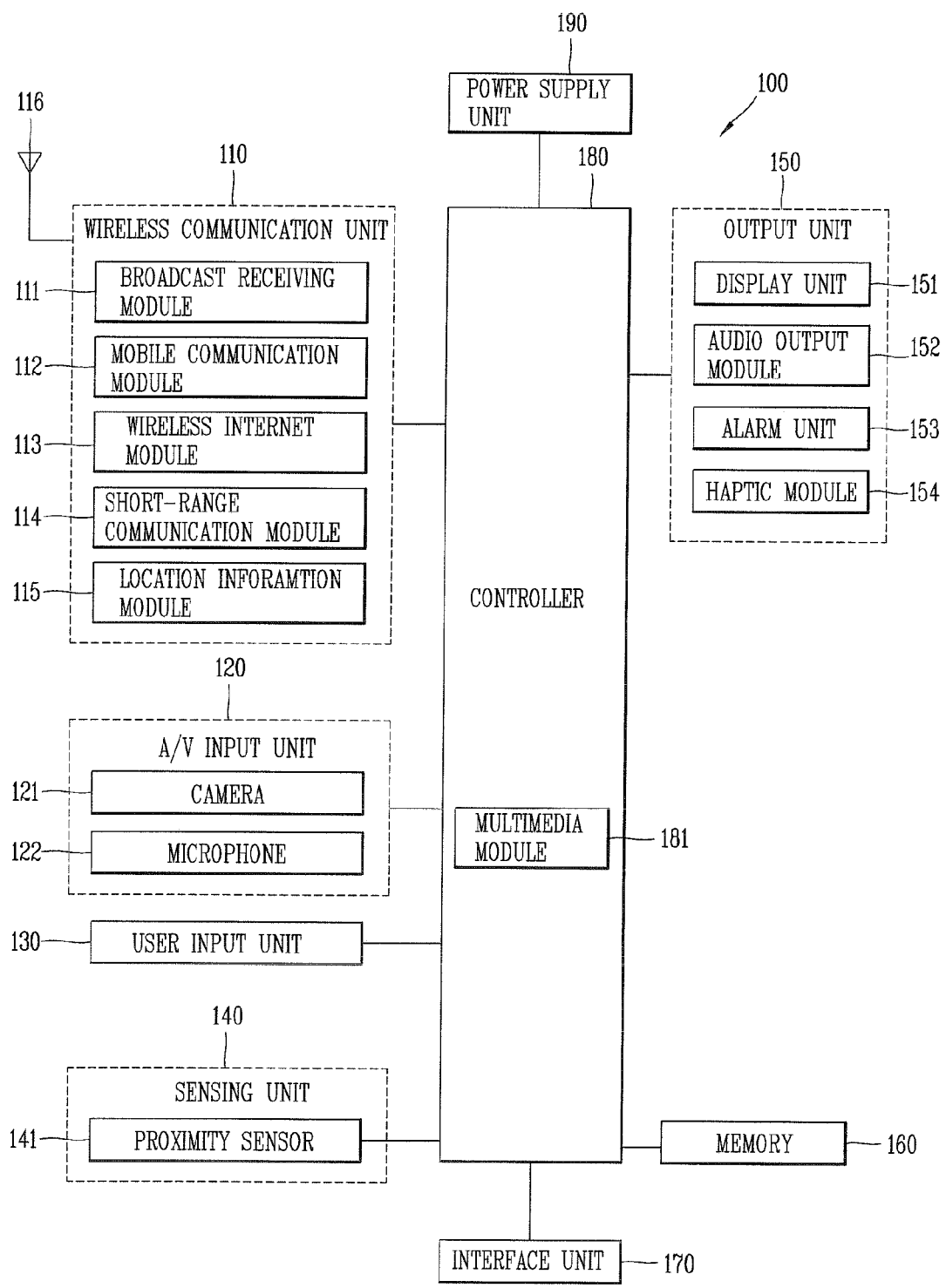
FIG. 1 is a block diagram illustrating a mobile terminal according to one embodiment of the present invention.

FIG. 1 is a block diagram illustrating a mobile terminal 100 according to one embodiment of the present invention. Referring to FIG. 1, the mobile terminal 100 may include a wireless communication unit 110, an audio/video (NV) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements 110-190 of the mobile terminal 100 will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. Here, the broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113, as a module for supporting wireless Internet access, may be built-in or externally installed to the mobile terminal 100. Here, it may be used a wireless Internet technique including a WLAN (Wireless LAN), Wi-Fi, Wibro (Wireless Broadband), Wimax™ (World Interoperability for Microwave Access), HSDPA (High Speed Downlink Packet Access), and the like.

The short-range communication module 114 is a module for supporting a short-range communication. Here, it may be used a short-range communication technology including Bluetooth™, Radio Frequency IDentification (RFID), Infrared Data Association (IrDA), Ultra WideBand (UWB), ZigBee™, and the like.

The location information module 115 is a module for checking or acquiring a location of the mobile terminal, and there is a global positioning system (GPS) module as a representative example.

Referring to FIG. 1, the AV (audio/video) input unit 120 receives an audio or video signal, and the AV (audio/video) input unit 120 may include a camera 121, a microphone 122, and the like. The camera 121 processes an image frame such as a still or moving image obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data processed by the microphone 122 may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a key pad, a dome switch, a touch pad (pressure/capacitance), a jog wheel, a jog switch, and the like.

The sensing unit 140 detects a current status of the mobile terminal 100 such as an opened or closed status of the mobile terminal 100, a location of the mobile terminal 100, an orientation of the mobile terminal 100, and the like. The sensing unit 140 generates a sensing signal for controlling the operation of the mobile terminal 100.

For example, when the mobile terminal 100 is a slide phone type, The sensing unit 140 may sense an opened or closed status of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation to the display unit 151.

The touch sensor may be implemented as a touch film, a touch sheet, a touch pad, and the like. The touch sensor may be configured to convert changes of a pressure applied to or a capacitance occurring from, a specific part of the display unit 151 into electric input signals. Also, the touch sensor may be configured to sense not only a touched position and a touched area, but also a touch pressure.

When the display unit 151 and the touch sensor have a layered structure therebetween, the display unit 151 may be used as an input device rather than or in addition to, an output device. The display unit 151 may be referred to as a "touch screen".

When there is a touch input through the touch screen, the corresponding signals are sent to a touch controller (not shown). The touch controller processes the received signals, and then transmits data corresponding to the processed signals to the controller 180. Accordingly, the controller 180 may sense which region of the display unit 151 has been touched.

When the touch screen is implemented with a capacitance type, it may be configured such that the proximity of a detection subject is sensed by changes of an electromagnetic field. In this case, the touch screen may be categorized as a proximity sensor 141.

The proximity sensor 141 refers to a sensor to detect the presence or absence of a detection subject using an electromagnetic field or infrared rays without a mechanical contact. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to provide an output associated with visual sense, auditory sense, tactile sense, and the like, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

At least one display (or display element) included in the display unit 151 may be configured with a transparent or optical transparent type to allow viewing of the exterior through the display unit. It may be referred to as a transparent display. An example of the typical transparent displays may include a transparent LCD (TOLED), and the like. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to the functions performed in the mobile terminal 100 (e.g., sound alarming a call received or a message received, and so on). The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 153 may be categorized into part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the portable terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input carried out on the touch screen as text or image.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the processing method of a user input to the mobile terminal 100 will be described.

The user input unit 130 is manipulated to receive a command for controlling the operation of the portable terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons, or may be implemented in three-dimensional solid images. For an input of the visual information, at least one of the characters, numerals, symbols, graphics, or icons may be displayed with a predetermined arrangement so as to be implemented in a form of keypad. Such a keypad may be referred to as a so-called "soft key."

The display unit 151 may operate on an entire region or operate by dividing into a plurality of regions. In case of the latter, the plurality of regions may be configured to operate in an associative way.

For example, an output window and an input window may be displayed on the upper portion and lower portion of the display unit, respectively. The output window and the input window may be regions allocated to output or input information, respectively. A soft key on which numerals for inputting phone numbers or the like are displayed is displayed on the input window.

When the soft key is touched, numerals corresponding to the touched soft key are displayed on the output window. When the manipulating unit is manipulated, a call connection for the phone number displayed on the output window is attempted or a text displayed on the output window may be input to an application.

The display unit 151 or the touch pad may be configured to sense a touch scroll. The user may move an object displayed on the display unit 151, for example, a cursor or pointer placed on an icon, by scrolling the display unit 151 or the touch pad. Moreover, when a finger is moved on the display unit 151 or the touch pad, a path of the finger may be visually displayed on the display unit 151. It may be useful to edit an image displayed on the display unit 151.

One function of the mobile terminal 100 may be executed when the display unit 151 and the touch pad are touched together within a predetermined period of time. Touching together when the user clamps a terminal body of the mobile terminal 100 using the thumb and forefinger. One of the functions executed in the mobile terminal 100 may involve activation or de-activation for the display unit 151 or the touch pad.

Figure 2A:
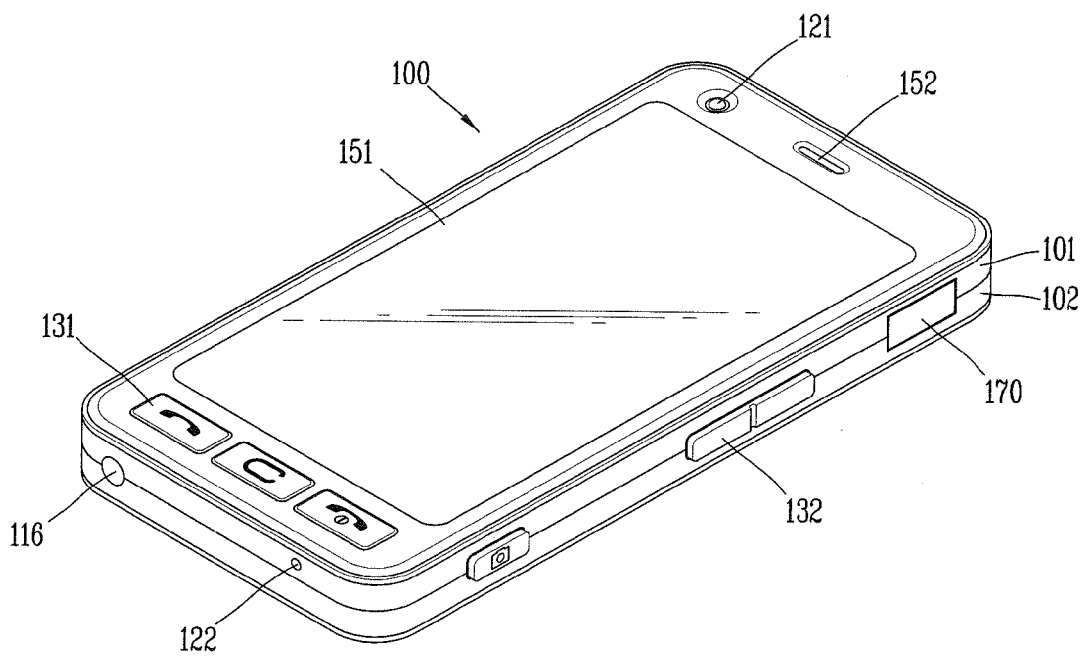
FIGS. 2A and 2B are perspective views illustrating the external appearance of a mobile terminal according to one embodiment of the present invention.
Figure 2B:
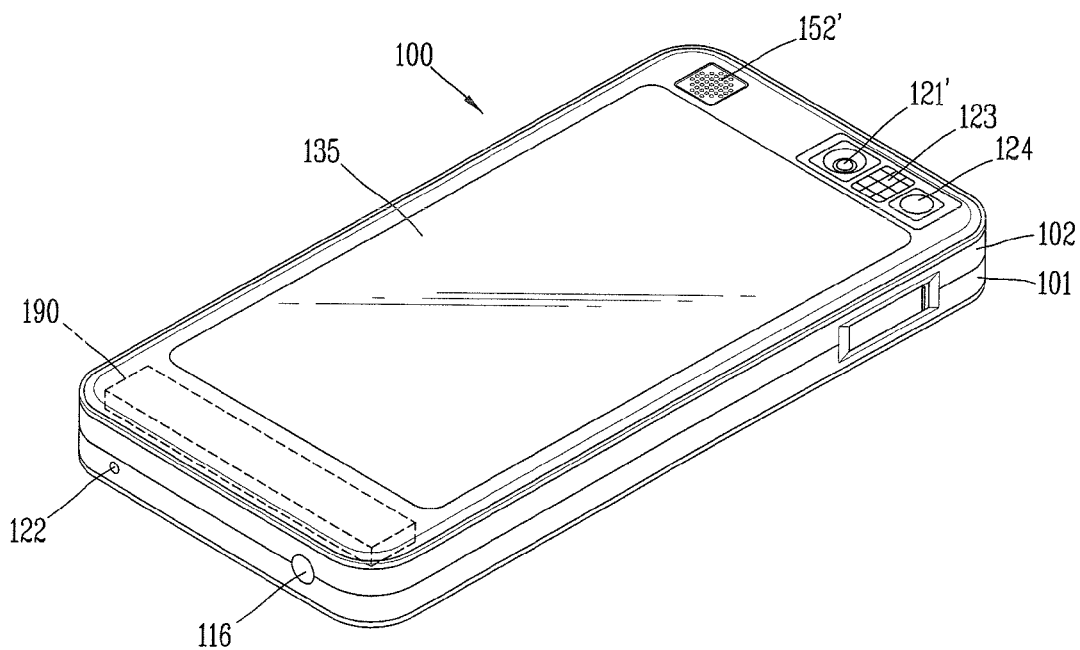

FIGS. 2A and 2B are perspective views illustrating the external appearance of a mobile terminal 100 according to on embodiment of the present invention. FIG. 2A illustrates a front surface and one lateral surface of the mobile terminal 100, and FIG. 2B illustrates a rear surface and the other lateral surface of the mobile terminal 100.

Referring to FIG. 2A, the mobile terminal 100 is provided with a bar-type terminal body. However, the present invention is not only limited to this type of terminal, but also applicable to various structures of terminals such as slide-type, folder-type, swivel-type, swing-type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface unit 170, and the like may be arranged on the terminal body, mainly on the front case 101.

The display unit 151 occupies a portion of the front case 101. The audio output unit 152 and the camera 121 are disposed on a region adjacent to one of both ends of the display unit 151, and the first manipulation unit 131 and the microphone 122 are disposed on a region adjacent to the other end thereof. The second manipulation unit 132 and the interface 170, and the like, may be disposed on a lateral surface of the front case 101 and the rear case 102.

The user input unit 130 is manipulated to receive a command for controlling the operation of the portable terminal 100. The user input unit 130 may include a first manipulation unit 131 and a second manipulation unit 132.

A first 131 or a second 132 manipulating unit may receive various commands. The first manipulation unit 131 may be used to receive a command, such as start, end, scroll, or the like. The second manipulation unit 132 may be used to receive a command, such as controlling a volume level being output from the audio output unit 152, or switching it into a touch recognition mode of the display unit 151.

Referring to FIG. 2B, a camera 121' may be additionally mounted on a rear surface of the terminal body, namely, the rear case 102. The camera 121' has an image capturing direction, which is substantially opposite to the direction of the camera 121 (refer to FIG. 2A), and may have different pixels from those of the camera 121.

For example, it is preferable that the camera 121 has a relatively small number of pixels that is not enough to cause a difficulty when the user captures his or her own face and sends it to the other party during a video call or the like. The camera 121' has a relatively large number of pixels since the user often captures a general object that is not sent immediately.

Meanwhile, the cameras 121, 121' may be provided in the terminal body in a rotatable and pop-upable manner.

Furthermore, a flash 123 and a mirror 124 may be additionally disposed adjacent to the camera 121'. The flash 123 illuminates light toward an object when capturing the object with the camera 121'. The mirror 124 allows the user to look at his or her own reflected face when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call.

Furthermore, an antenna 116 for receiving broadcast signals may be additionally disposed on a lateral surface of the terminal body. The antenna 116 constituting a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similar to the display unit 151 (refer to FIG. 2A). Furthermore, a rear side display unit for visual information may be also additionally mounted on the touch pad 135. In this case, information displayed on both surfaces of the front side display unit 151 and the rear side display unit may be controlled by the touch pad 135.

The touch pad 135 may be operated in conjunction with the display unit 151. The touch pad 135 may be disposed in parallel to and at a rear side of the display unit 151. The touch pad 135 may have the same size as or a smaller size than the display unit 151.

Hereinafter, according to an embodiment of the present invention, a mobile terminal for setting a battery assigned amount to a designated contact address, and controlling consumption power based on information on the designated contact address will be described in detail.

Figure 3:
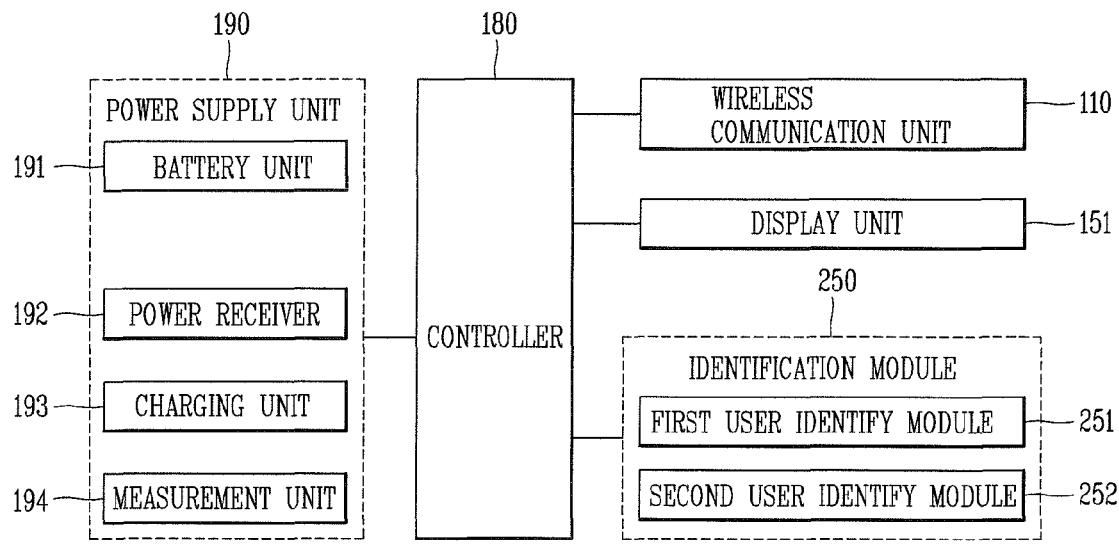
FIG. 3 is a block diagram illustrating a mobile terminal according to an embodiment of the present invention.

FIG. 3 is a block diagram illustrating a mobile terminal 100 according to an embodiment of the present invention. Referring to FIG. 3, the mobile terminal 100 may include a power supply unit 190, a controller 180, a wireless communication unit 110, a display unit 151, and an identification module 250.

The power supply unit 190 may supply power to constituent elements such as the controller 180, the wireless communication unit 110, the display unit 151, the identification module 250, and the like. To this end, the power supply unit 190 may include a battery unit 191, a power receiver 192, a charging unit 193, and a measurement unit 194.

The battery unit 191 may be configured to supply power an electronic element mounted on the terminal body, and to be charged by power supplied from the outside. Furthermore, the battery unit 191 may be charged by wireless power received through the power receiver 192.

The power receiver 192 may detect a wireless charging region, and receives wireless power delivered in a wireless manner from a wireless power transmission device corresponding to the detected wireless charging region. The wireless power may be delivered by using a wireless power transmission scheme such as an inductive coupling method, a resonant coupling method, or a mixed method thereof.

The power receiver 192 may include constituent elements required to receive wireless power according to the foregoing wireless power transmission scheme. For example, the power receiver 192 may include a coil for receiving wireless power in a magnetic field or electromagnetic field type. More specifically, the power receiver 192 may include a secondary coil for inducing current by a changing magnetic field as an element according to an inductive coupling method. Furthermore, the power receiver 192 may include a coil and a resonant circuit for generating resonance phenomenon by an electromagnetic field having a specific resonant frequency.

The charging unit 193 may charge the battery unit 191 using power supplied or delivered from a wired power supply unit (wired charger), a wireless power transmission device (wireless charger), or the like. At this time, the charging unit 193 may control charging voltage, charging current, charging speed, and the like.

The measurement unit 194 may measure a battery remaining amount for the battery unit 191. The measurement unit 194 may detect data such as voltage, current, electrical resistance, temperature, life, discharge rate, and the like, and may include an integrated circuit (IC) for calculating the battery remaining amount using the data.

The measurement unit 194 may measure and update a battery remaining amount for each predetermined period of time (for example, one second interval, one minute interval, etc.) Furthermore, the measurement unit 194 may measure a battery remaining amount whenever an event occurs (for example, phone call, data transmission and reception, application execution, detection operation, etc). Furthermore, the measurement unit 194 may measure a battery remaining amount in response to a control command entered by a user.

The controller 180 may implement a limited mode for limiting some functions based on information on a designated contact address, a battery remaining amount, and a battery assigned amount. More specifically, the controller 180 may set the battery assigned amount to a designated contact address and implement a limited mode according to a result of comparing the battery remaining amount with the battery assigned amount. For example, the limited mode can be implemented when the battery remaining amount is less than or equal to the battery assigned amount.

Here, the contact address for setting a battery assigned amount may be designated on the basis of the user's input. For example, a contact address or contact address group for an object (family, friend, company, etc) in acquaintance with the user or having a special meaning may be designated. In this case, the designated contact address may be a phone number on the phone number list or a new phone number entered by the user.

Furthermore, the designated contact address may include a phone number and homepage address of the organization associated with emergency services which are specified by each country such as 911 (U.S.), 119 (Korea, Japan), and the like. The method of specifying a contact address and setting a battery assigned amount will be described in more detail with reference to FIGS. 6 through 8.

A battery assigned amount specified based on the user's input may be set to a designated contact address. The battery assigned amount may denote a value to be compared with the battery remaining amount to implement a limited mode, and given to the designated contact address. The battery assigned amount may be expressed as a ratio (%) with respect to the maximum charged amount.

In this manner, when the battery assigned amount is set to a designated contact address, information on the designated contact address may include information on the set battery assigned amount as well as a phone number, an e-mail address, identification information, and the like.

When the limited mode is implemented, the controller 180 may limit a function based on information on the other contact addresses other than the designated contact address to which a battery assigned amount is assigned.

For example, when a communication function is implemented in the limited mode, the controller 180 may allow a communication function with a terminal corresponding to the designated contact address whereas the controller 180 may block a communication function with terminals corresponding to the other contact addresses.

Furthermore, when a remote control function is implemented in the limited mode, the controller 180 may allow a remote control operation requested by a terminal corresponding to the designated contact address whereas the controller 180 may block a remote control operation requested by terminals corresponding to the other contact addresses.

Furthermore, when a phone call and text function is carried out in the limited mode, the controller 180 may activate an item corresponding to the designated contact address on the phone number list whereas the controller 180 may deactivate an item corresponding to the other designated contact addresses.

Furthermore, when an e-mail function is carried out in the limited mode, the controller 180 may allow the reception of appended files from the designated contact address whereas the controller 180 may block the reception of appended files from the other contact addresses.

Furthermore, when a messenger application is executed in the limited mode, the controller 180 may allow the user's access state information to be displayed on-line for the designated contact address whereas the controller 180 may allow the user's access state information to be displayed off-line or a vacancy for the other designated contact addresses.

Furthermore, when the contact addresses other than the designated contact address are not referred to even when a command for executing an application is not received in the limited mode, the controller 180 may ignore the execution of the command. In other words, the execution of an application corresponding to the command may be blocked. For example, when the designated contact address is not registered in the messenger application, even when a command for executing a messenger application is received in the limited mode, the controller 180 may ignore this command and block the execution of the messenger application.

When the limited mode is implemented, the controller 180 may control 3G data communication, Wi-Fi sensing, Bluetooth™ sensing, GPS sensing, acceleration sensing, screen brightness, multi tasking function, and the like, to reduce the entire power consumption of the mobile terminal 100. For example, the controller 180 may set the screen brightness of the display unit 151 to dim regardless whether it is based on information on the designated contact address in the limited mode.

When the limited mode is implemented, the controller 180 may generate notification information on the limited mode. Furthermore, the controller 180 may update notification information at each predetermined time. For example, a period for generating notification information may correspond to the period for measuring a battery remaining amount.

Here, notification information on the limited mode may include battery status information, reply information, location information of the mobile terminal 100, and the like. The battery status information may include a battery remaining amount when generating notification information.

The reply information may represent information on an object with whom a person who has received notification information can get in touch in response to the notification information. For example, the reply information may include a phone number of the calling terminal for providing notification information, an address of the server (for example, SNS server) for receiving notification information from the calling terminal and posting that information and its associated authentication information, and other phone numbers, e-mail addresses, webpage addresses, and the like that can be approached by the called terminal.

Meanwhile, when location information is provided to the mobile terminal 100 by a location-based service (LBS), the replay information may be determined based on the location information of the mobile terminal 100. For example, when the location information of the mobile terminal 100 corresponds to a user's (caller's) home, the replay information may include the user's home phone number.

Furthermore, the controller 180 may search a terminal existing within a predetermined radius from the center of the mobile terminal 100, and corresponding to a contact address on the phone number list of the mobile terminal 100 (hereinafter, referred to as an "adjacent terminal") using a location-based service. The reply information may include a contact address corresponding to the searched adjacent terminal, for example, a family member's or friend's home phone number, a mobile phone number, an e-mail address, and the like.

The wireless communication unit 110 may transmit notification information on the limited mode generated by the controller 180 to at least one of a terminal, a social network service (SNS) sever, and a base station, which corresponds to the designated contact address.

Furthermore, when a wireless charging region is detected in the limited mode, the wireless communication unit 110 may receive the location information of the wireless charging region from a wireless power transmission device corresponding to the wireless charging region. However, distance information between the mobile terminal 100 and the wireless power transmission device may be estimated based on the strength of wireless power measured by the power receiver 192.

The display unit 151 may display various information on the operation and status of the mobile terminal 100 through a graphical user interface (GUI). The display unit 151 may display a battery remaining amount measured by the measurement unit 194. In the limited mode, the display unit 151 may display notification information on the limited mode, a menu window for implementing a function based on information on the designated contact address, and the like.

The identification module 250 may include a plurality of universal subscriber identity modules (USIMs). For example, the identification module 250 may include a first identification module 251 for storing first user information and a second identification 252 for storing second user information.

In this manner, when a plurality of identification modules 251, 252 are provided in the mobile terminal 100, a plurality of users may share the mobile terminal 100 or one user may use a plurality of identification information (for example, a dual number). Accordingly, each user may perform a different environment setting for the mobile terminal 100. This means that a battery assigned amount for the battery unit 191 may be set to contact addresses corresponding to the first 251 and the second 252 identification module, respectively.

As described above, a mobile terminal 100 according to an embodiment of the present invention may compare a battery assigned amount set to the designated contact address with a battery remaining amount, and implement a limited mode (power saving mode) according to the result. Furthermore, the mobile terminal 100 may limit a function based on information on undesignated contact address to reduce power consumption.

Figure 4:
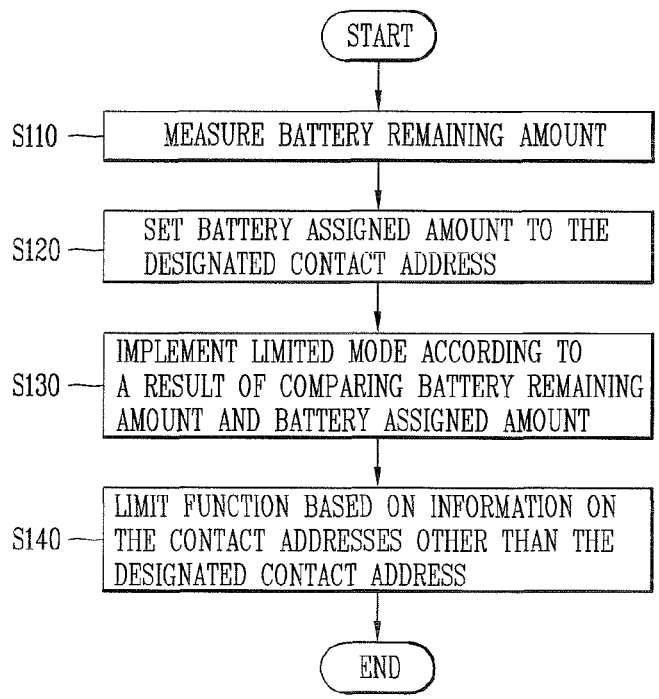
FIG. 4 is a flow chart for explaining a method of operating a mobile terminal according to an embodiment of the present invention.

FIG. 4 is a flow chart for explaining a method of operating a mobile terminal according to an embodiment of the present invention. Referring to FIG. 4, measuring a battery remaining amount for the battery unit 191 (S110) and setting a battery assigned amount for the battery unit to a designated contact address (S120) is performed.

Next, implementing a limited mode according to a result of comparing the battery remaining amount with the battery assigned amount (S130) is progressed. In other words, the battery assigned amount may be a reference value for implementing a limited mode.

When the limited mode is implemented, limiting a function based on information on the contact addresses other than the designated contact address (S140) is performed. For example, even if a receiving signal is received from an undesignated contact address when the limited mode is implemented, the controller 180 can ignore the signal.

Figure 5:
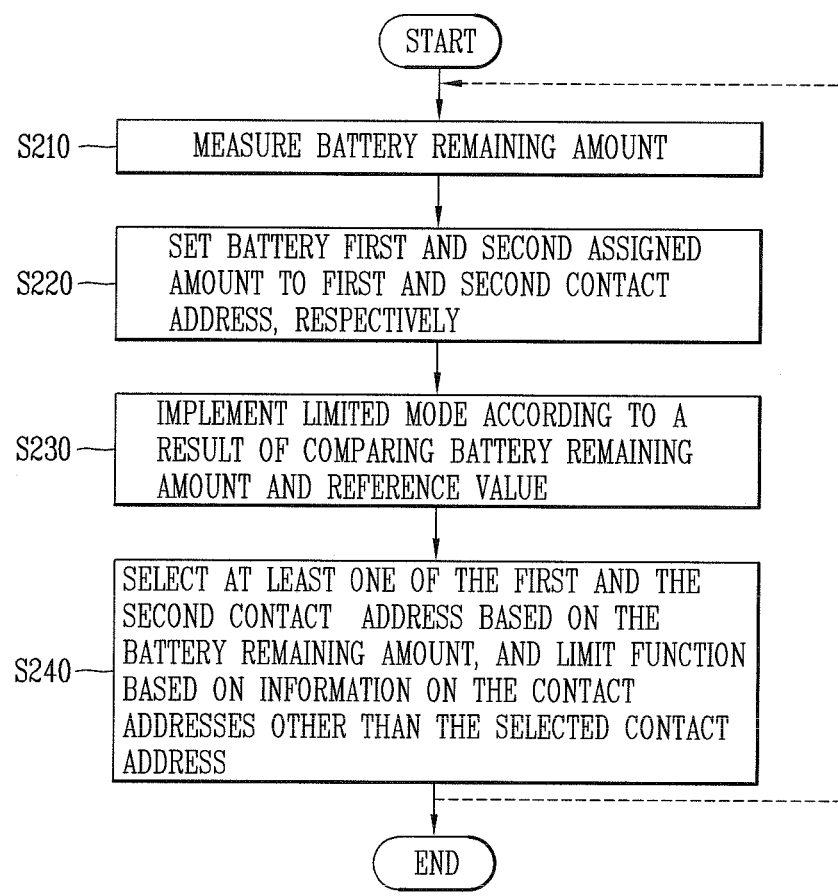
FIG. 5 is a flow chart for explaining a method of operating a mobile terminal according to another embodiment of the present invention.

FIG. 5 is a flow chart for explaining a method of operating a mobile terminal 100 according to another embodiment of the present invention. Specifically a plurality of battery assigned amounts are set to a plurality of designated contact addresses, respectively. Referring to FIG. 5, measuring a battery remaining amount for the battery unit 191 (S210) is performed as illustrated in FIG. 4.

Subsequently, setting a first and a second battery assigned amount for the battery unit 191 to a first and a second contact address, respectively (S220) is performed. In other words, a plurality of battery assigned amounts may be set to a plurality of contact addresses, respectively.

Next, implementing a limited mode according to a result of comparing the measured battery remaining amount with a reference value (S230) is performed. The reference value may be a sum of the first and the second battery assigned amount. For example, when the battery remaining amount is less than a sum of the first and the second battery assigned amount, a limited mode may be implemented.

When the limited mode is implemented, selecting at least one of the first and the second contact address based on the battery remaining amount, and limiting a function based on information on the other contact addresses other than the selected contact address (S240) is performed.

Meanwhile, measuring a battery remaining amount (S210) may be repeatedly performed. In other words, the battery remaining amount may be repeatedly measured and updated until the battery unit 191 is discharged even after implementing the limited mode. Accordingly, if power is consumed to change the battery remaining amount in the limited mode, then the selected contact address may also vary based on the change and as a result, the limited function may also vary.

Figure 6:
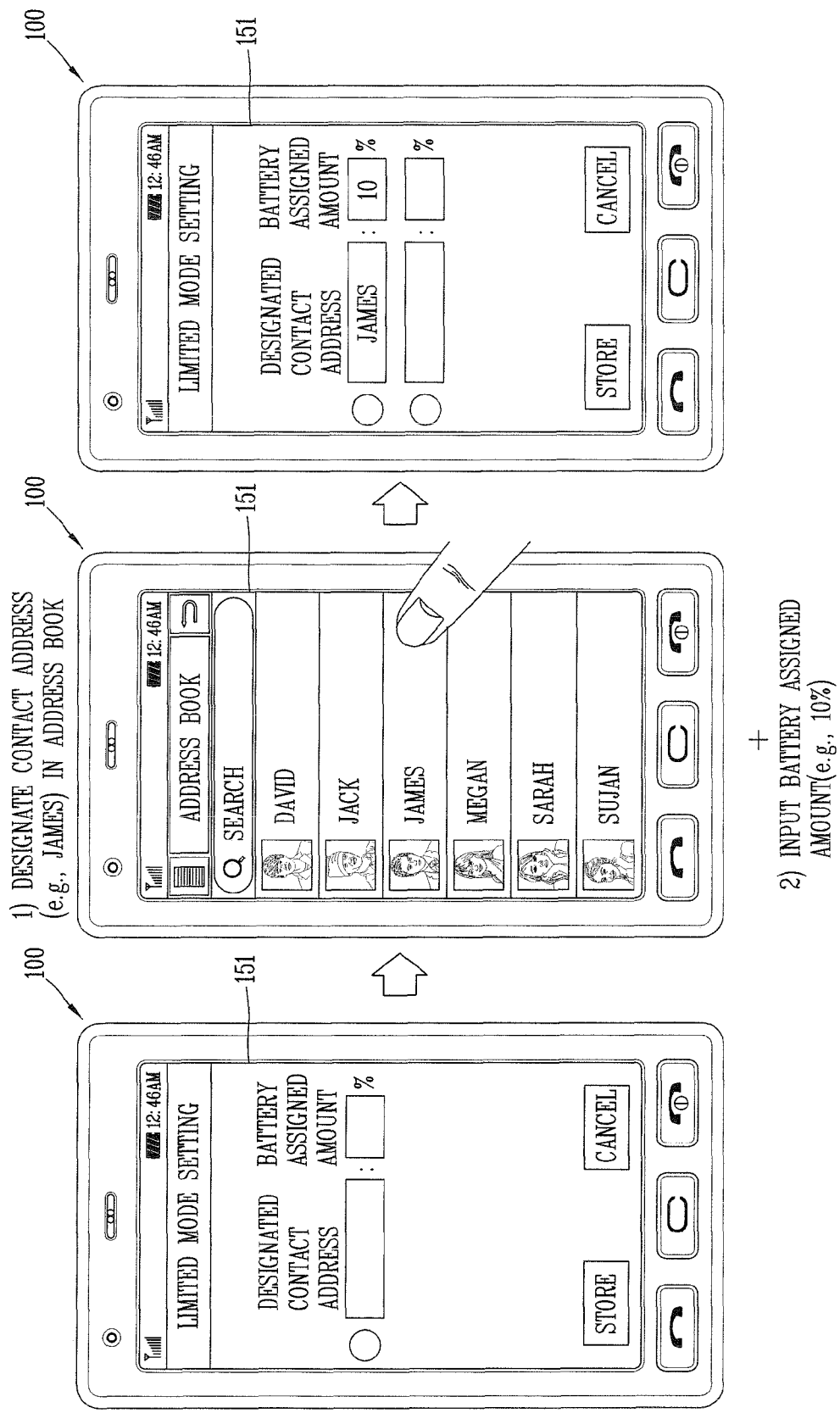
Figure 7:
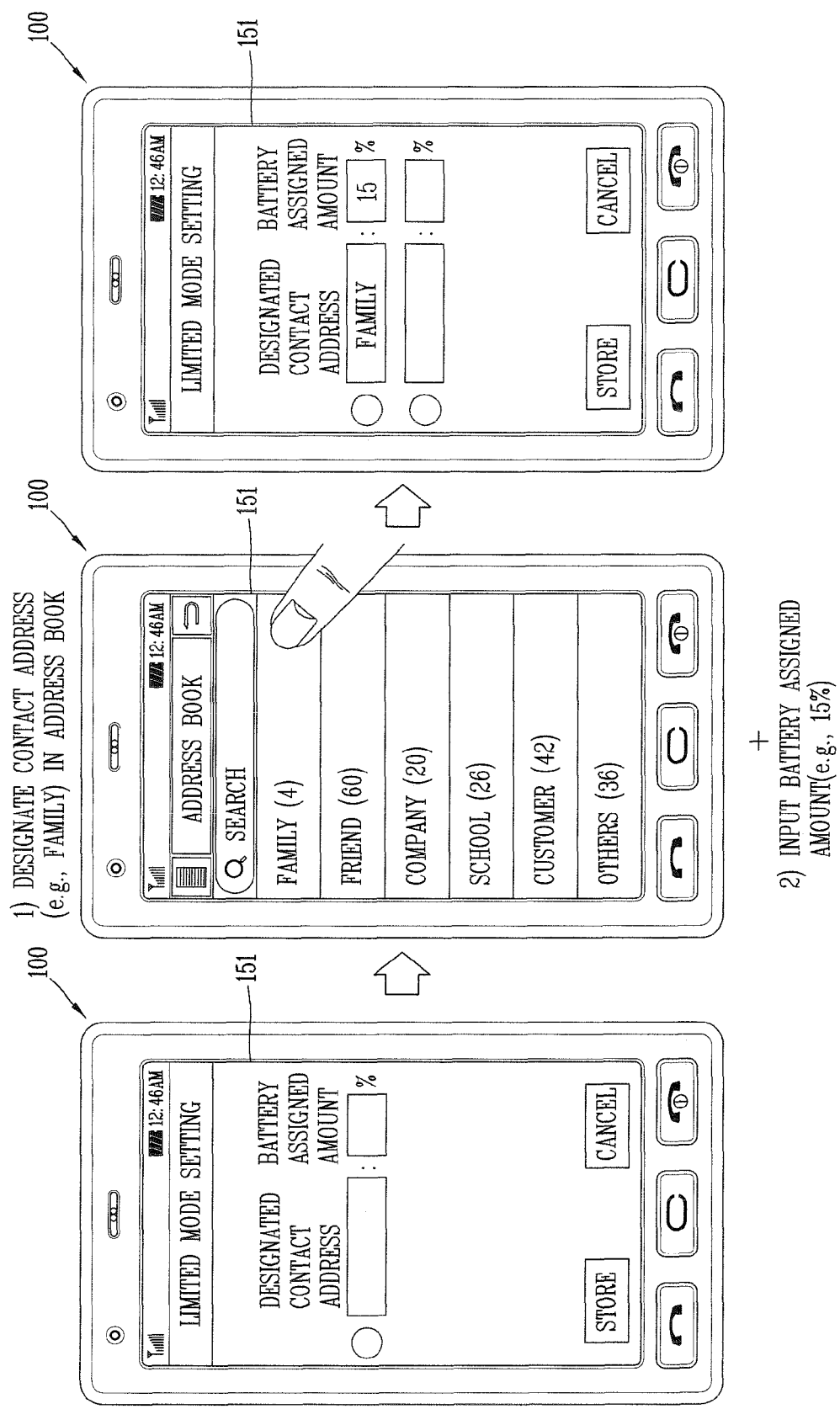

FIGS. 6 through 8 are conceptual views illustrating a process of setting a limited mode according to the embodiments of the present invention. The display unit 151 may display a screen for setting a limited mode (hereinafter, referred to as a "mode setting screen"). The user may designate a contact address using the mode setting screen and enter a battery assigned amount for setting the designated contact address.

Referring to FIG. 6, a signal contact address may be designated on the address book. Furthermore, a battery assigned amount for setting the designated single contact address may be entered through the user input unit 130. For example, a single contact address "James" may be designated on the address book, and a battery assigned amount 10% corresponding to the contact address may be entered.

Referring to FIG. 7, a contact address group may be designated on the address book. Furthermore, a battery assigned amount for setting the designated contact address group may be entered. For example, a contact address group "family" is designated on the address book, and a battery assigned amount 15% corresponding to the contact address group may be entered.

Single contact addresses included in a contact address group may be all designated by designating the contact address group. For example, as illustrated in the FIG. 7, when a contact address group "family" is designated, four single contact addresses included in the contact address group are all designated.

Referring to FIG. 8, a specific phone number (for example, contact address that is not registered in the address book) may be entered as a designated contact address for setting a limited mode. Furthermore, a battery assigned amount set to the designated contact address may be entered. For example, phone number "+1-192-0000" may be entered and designated, and a battery assigned amount 20% corresponding to the designated contact address may be entered.

Figure 9A:
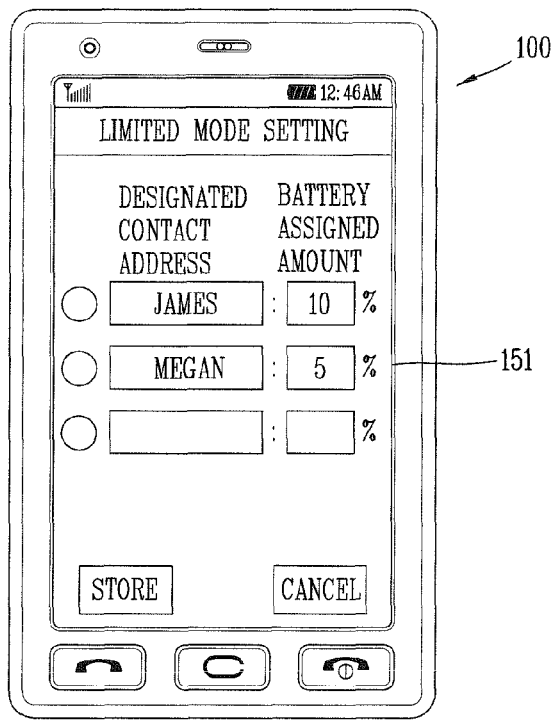
FIGS. 9A, 9B and 9C are conceptual views illustrating a mode setting screen when a plurality of contact addresses are designated according to an embodiment of the present invention.
Figure 9B:
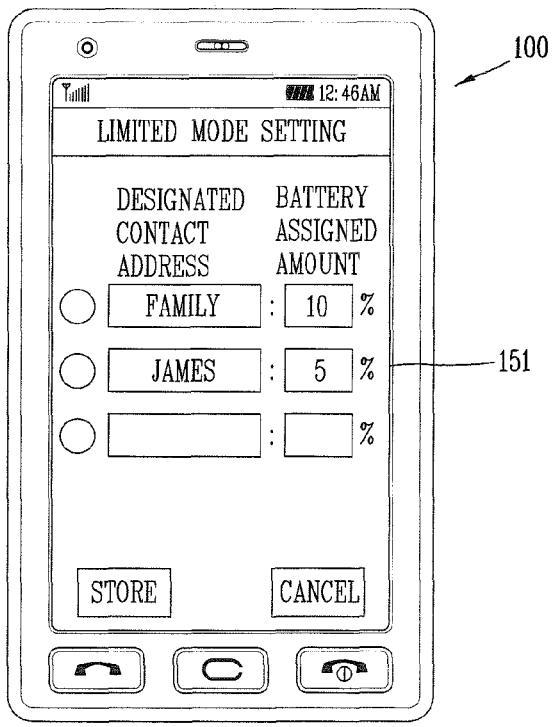
Figure 9C:
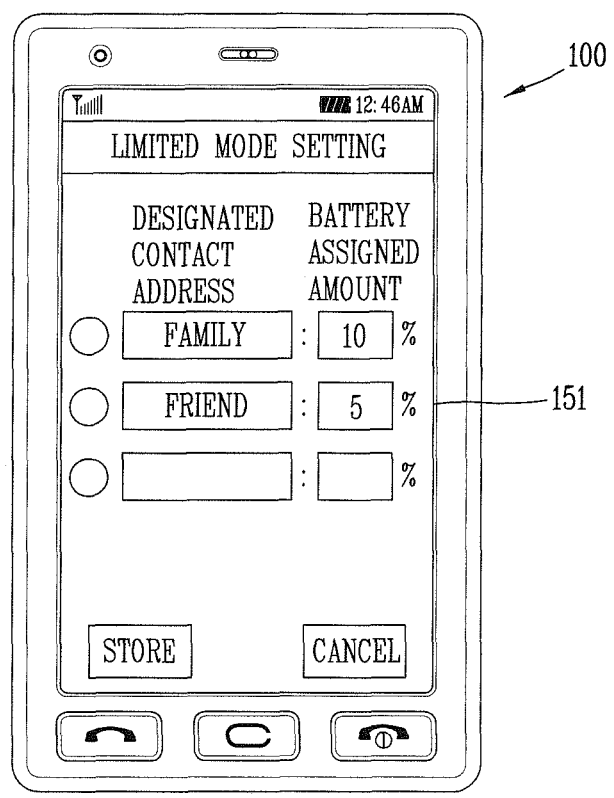

FIGS. 9A, 9B and 9C are conceptual views illustrating a mode setting screen when a plurality of contact addresses are designated according to an embodiment of the present invention. For the sake of brevity of explanation, it is assumed that two contact addresses, namely, a first contact address and a second contact address are designated.

Referring to FIG. 9A, both the first and the second contact address may be single contact addresses. For example, a single contact address "James" is designated as the first contact address, and a battery assigned amount 10% may be set to the address. Furthermore, a single contact address "Megan" is designated as the second contact address, and a battery assigned amount 5% may be set to the address.

Referring to FIG. 9B, the first contact address may be a contact address group, and the second contact address may be a single contact address. For example, a contact address group "family" is designated as the first contact address, and a battery assigned amount 10% may be set to the address. Furthermore, a single contact address "James" is designated as the second contact address, and a battery assigned amount 5% may be set to the address.

Referring to FIG. 9C, both the first and the second contact address may be contact address groups. For example, a contact address group "family" is designated as the first contact address, and a battery assigned amount 10% may be set to the address. Furthermore, a contact address group "friend" is designated as the second contact address, and a battery assigned amount 5% may be set to the address.

Figure 10:
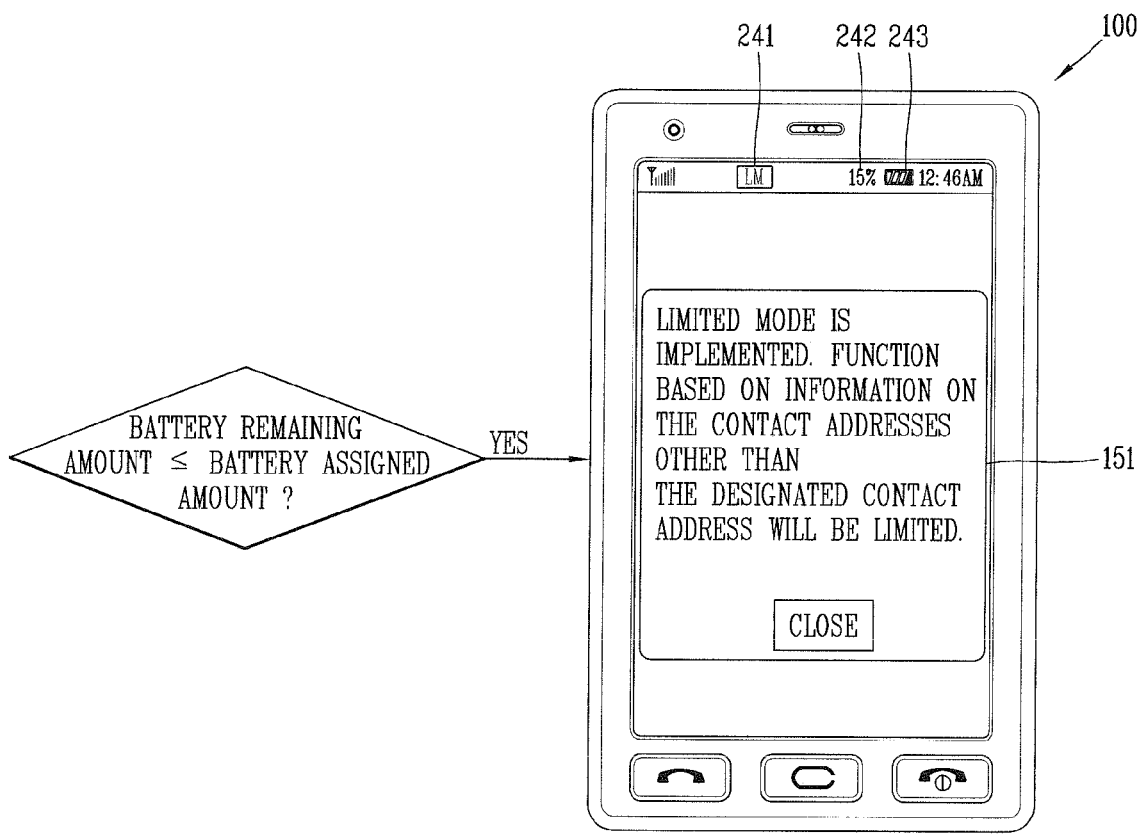
FIGS. 10 through 12 are conceptual views illustrating a user interface associated with a limited mode according to the embodiments of the present invention.
Figure 11:
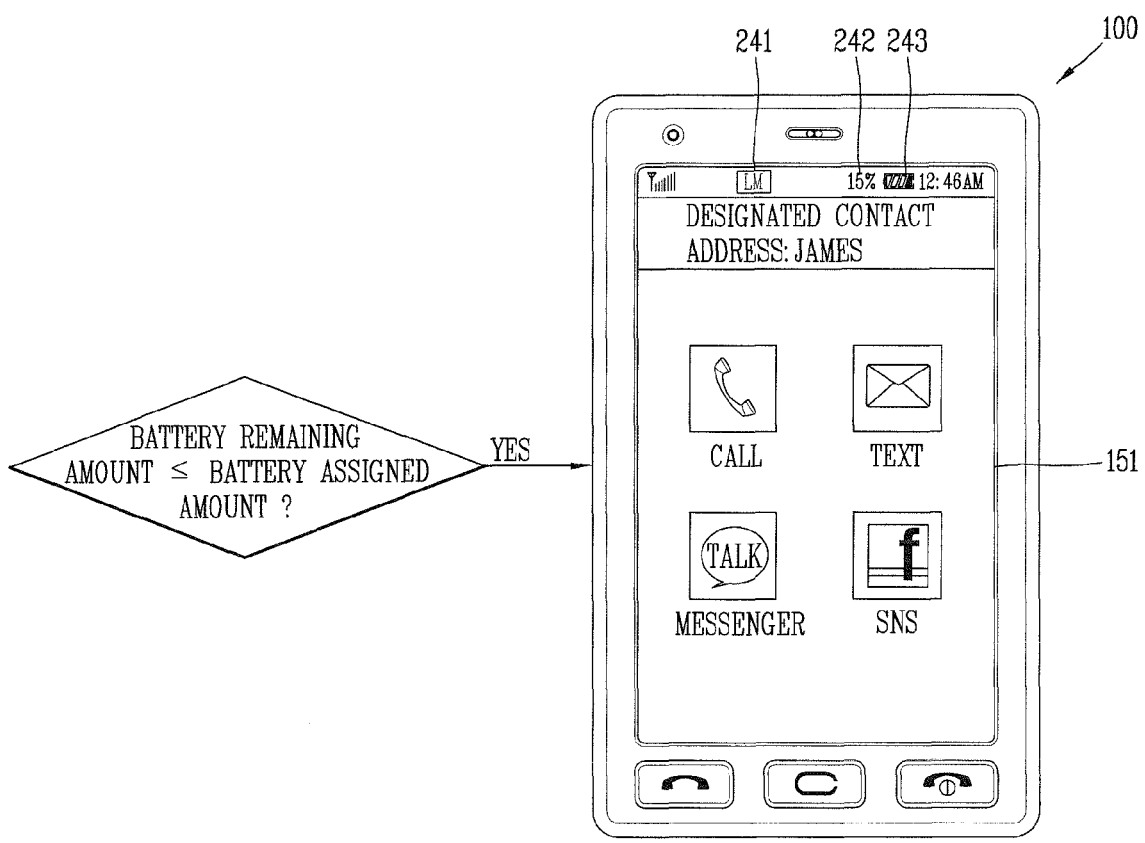
Figure 12:
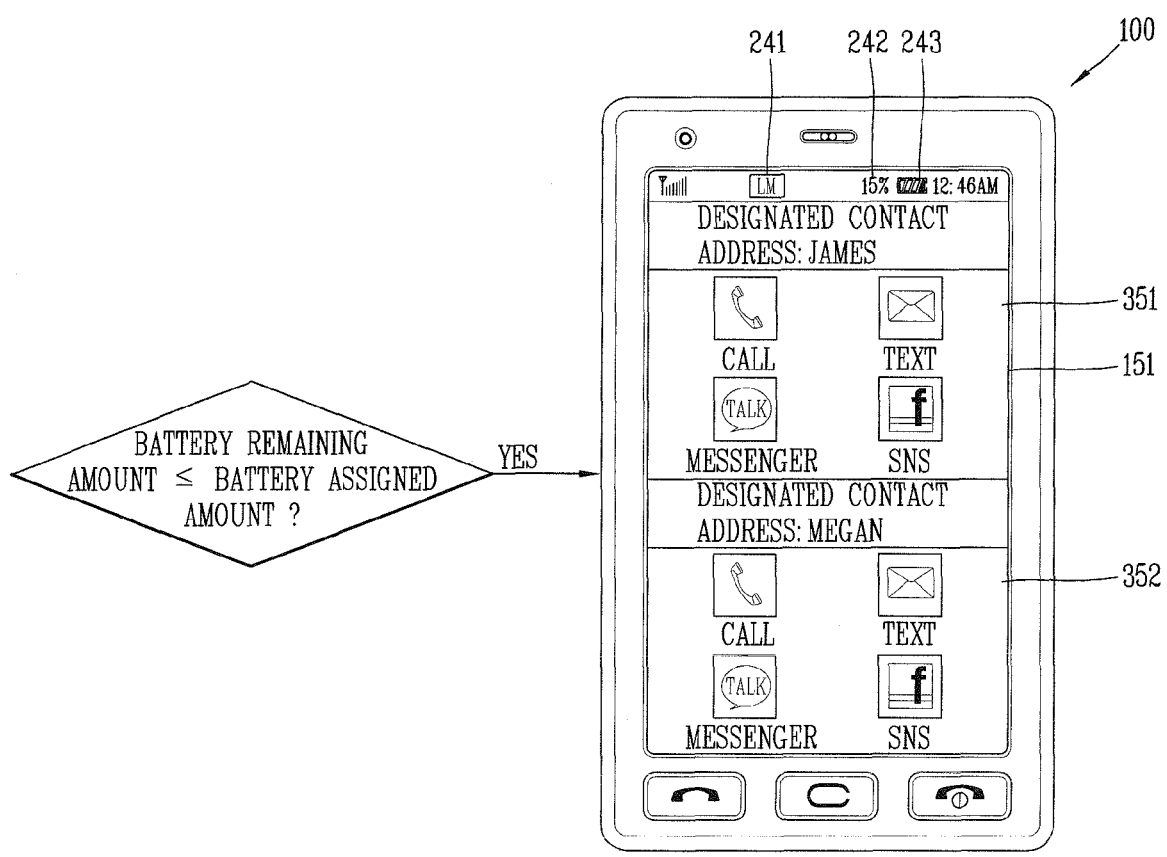

FIGS. 10 through 12 are conceptual views illustrating a user interface associated with a limited mode according to the embodiments of the present invention. As described above, the controller 180 may compare a battery remaining amount with a battery assigned amount, and as a result, implement a limited mode when the battery remaining amount is less than or equal to the battery assigned amount.

However, whether to implement the limited mode may be controlled according to the user's input. To this end, the display unit 151 may display a pop-up window asking whether to implement the limited mode, and a user may input a control command for determining whether to implement the limited mode by using the pop-up window.

More specifically, the display unit 151 may display a pop-up window for asking whether to implement the limited mode when the battery remaining amount is reduced less than or equal to the battery assigned amount in a state that a specific application is executed.

The controller 180 may maintain the execution of the application and implement the limited mode when an execution command is received by using the pop-up window, and the application is based on the designated contact address. The controller 180 may terminate the execution of the application and implement the limited mode when an execution command is received by using the pop-up window, and the application is not based on the designated contact address. On the contrary, the controller 180 may maintain the execution of the application and block the implementation of limited mode when a rejection command is received by using the pop-up window.

Referring to FIG. 10, when a limited mode is implemented, the display unit 151 may display notification information for the limited mode. Here, the notification information may include text or an indicator 241 indicating that the limited mode has been implemented.

Furthermore, the display unit 151 may display a battery remaining amount. In this case, the battery remaining amount may be displayed in the form of a numeral 242 or picture 243 corresponding to a ratio (%) with respect to the maximum charged amount.

Referring to FIG. 11, when the limited mode is implemented, the display unit 151 may display a menu window for implementing a function based on information on a designated contact address, namely, a contact address corresponding to the battery assigned amount.

For example, the display unit 151 may display a menu window including menus for implementing functions such as a phone call, a text, a messenger, a social network service, and the like, to the designated contact address "James". Furthermore, though not shown in the drawing, the display unit 151 may display additional information associated with the designated contact address "James", for example, personal information, regional information, weather information, and the like.

When selection to each menu is detected, the controller 180 may implement a function corresponding to the selected menu using the designated contact address "James" as a dedicated contact address. For example, when selection to a phone call menu is detected, the controller can make a phone call to "James".

Referring to FIG. 12, when a limited mode designated by a plurality of contact addresses is carried out, the display unit 151 may display a menu window 351 including menus for implementing functions based on information on each designated contact address.

For example, the display unit 151 may display a first menu window including menus for implementing functions such as a phone call, a text, a messenger, a social network service, and the like, to the first contact address "James", and a second menu window 352 including menus for implementing functions such as a phone call, a text, a messenger, a social network service, and the like, to the second contact address "Megan".

When selection of a menu on the first menu window 351 is detected, the controller 180 may implement a function corresponding to the selected menu by using the first contact address "James" as a dedicated contact address. Furthermore, when selection to a menu on the second menu window 352 is detected, the controller 180 may implement a function corresponding to the selected menu by using the second contact address "Megan" as a dedicated contact address.

As described above, according to a mobile terminal 100 associated with the present invention, when a limited mode is implemented, a menu window for implementing only a function based on information on the designated contact address may be provided. The user may implement a function allowed in the limited mode in a convenient manner using the menu window.

Figure 13:
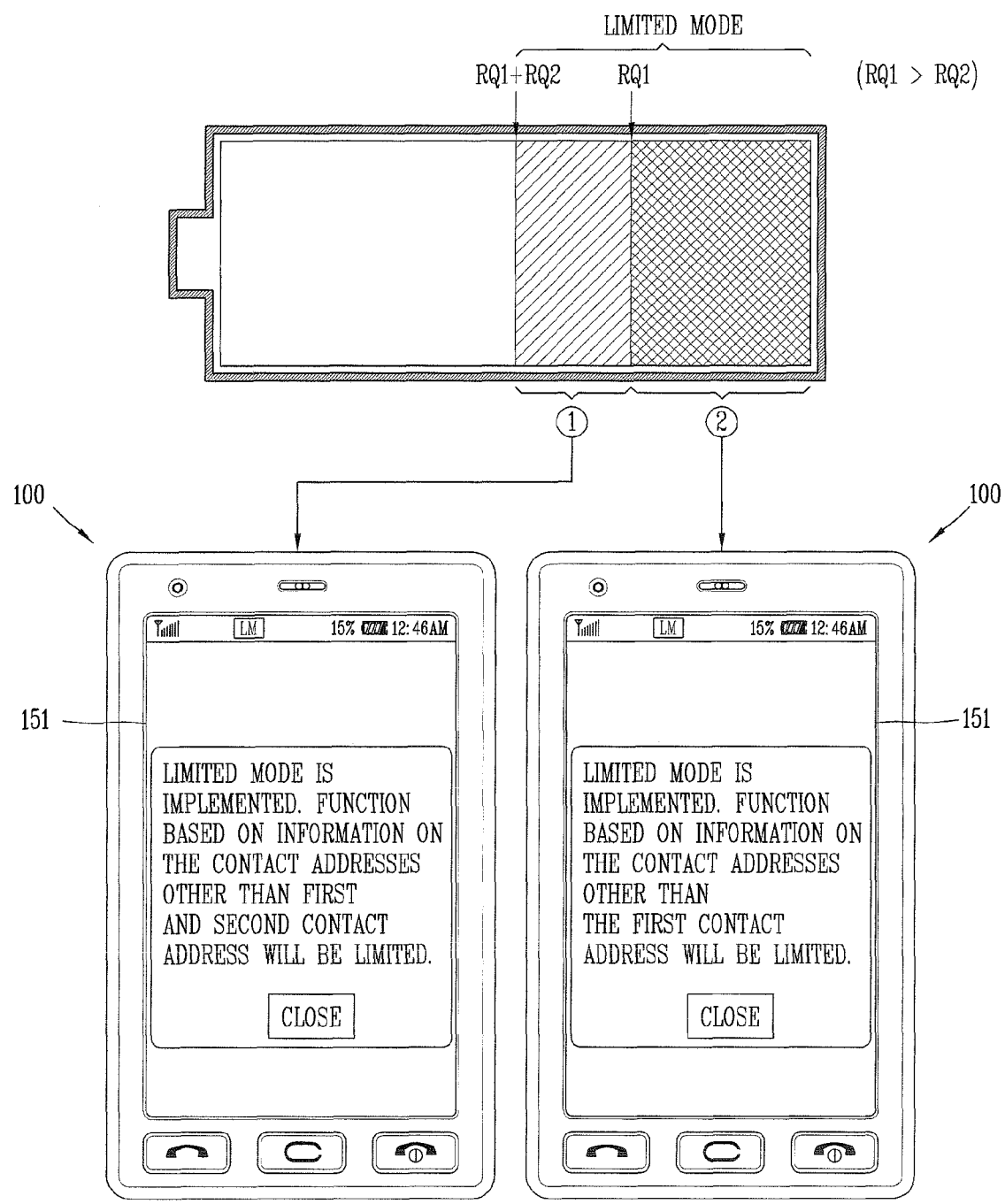
FIGS. 13 and 14 are conceptual views for explaining a method of implementing a limited mode according to the embodiments of the present invention.
Figure 14:
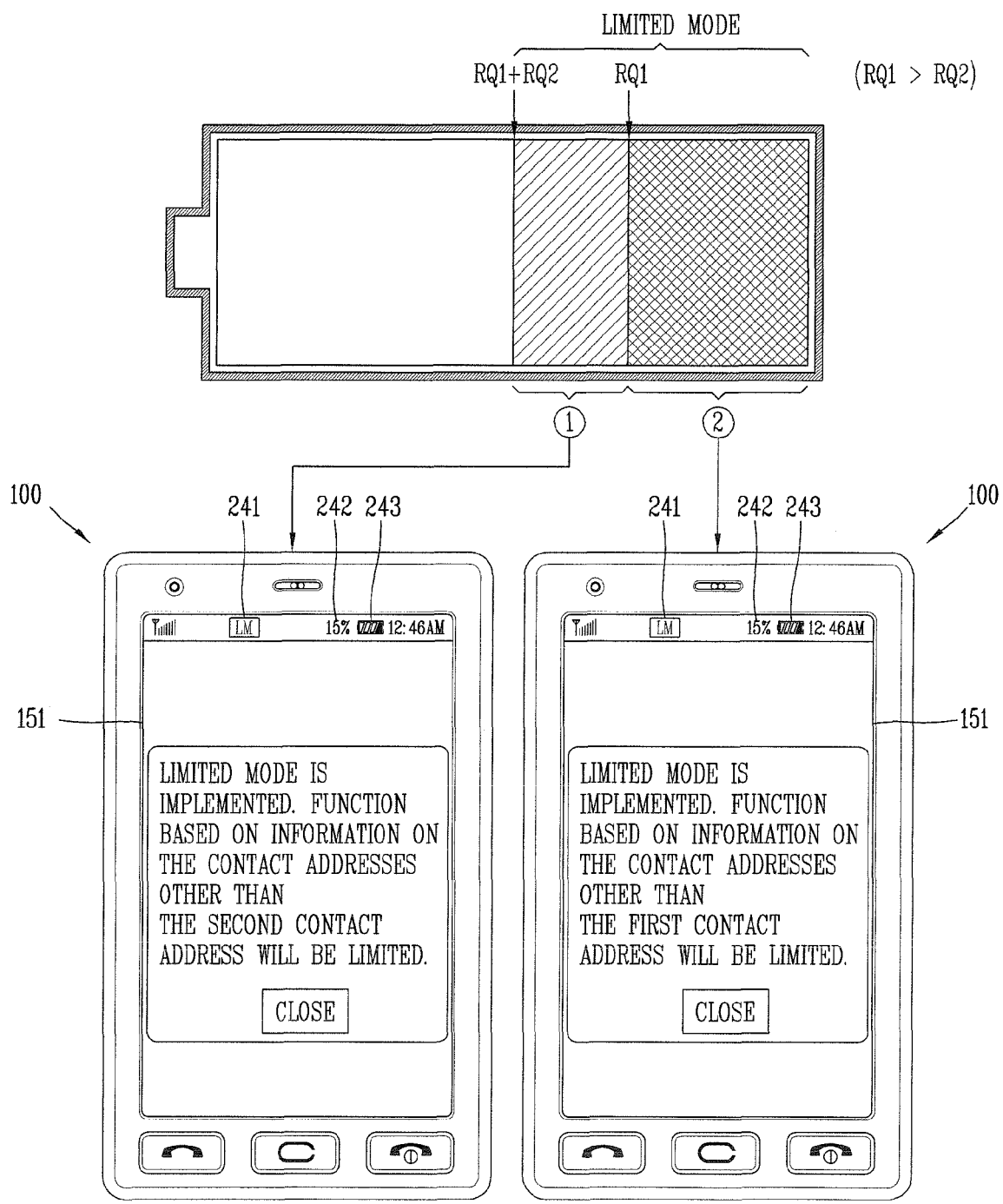

FIGS. 13 and 14 are conceptual views for explaining a method of implementing a limited mode according to the embodiments of the present invention. Here, a method of implementing a limited mode when a first battery assigned amount RQ1 and a second battery assigned amount RQ2 are set to a first and a second contact address, respectively, will be described. For the sake of brevity of explanation, it is assumed that the first battery assigned amount RQ1 is greater than the second battery assigned amount RQ2.

Referring to FIGS. 13 and 14, the controller 180 may implement a limited mode according to a result of comparing a battery remaining amount and a reference value. Here, the reference value may be a sum of the first RQ1 and second RQ2 battery assigned amounts. For example, when the battery remaining amount is less than the sum of the first RQ1 and second RQ2 battery assigned amounts, the limited mode may be implemented.

When the limited mode is implemented, the controller 180 may select at least one of a first and a second contact address based on the battery remaining amount, and limit a function based on information on the contact addresses other than the selected contact address. As described above, the battery remaining amount may be repeatedly measured and updated until the battery unit is discharged, the limited function may also vary according to a change of the battery remaining amount.

For example, as illustrated in FIG. 13, in a first battery assigned amount interval ① in which the battery remaining amount is less than or equal to the sum of the first RQ1 and second RQ2 battery assigned amounts and greater than the first battery assigned amount RQ1, the controller 180 may select both the first and the second contact address, and limit a function based on information on the contact addresses other than the first and the second contact address. Furthermore, in a second battery assigned amount interval ② in which the battery remaining amount is less than or equal to the first battery assigned amount RQ1, the controller 180 may select the first contact address, and limit a function based on information on the contact addresses other than the first contact address.

In other words, a function associated with the contact address may be allowed only if it is a designated contact address in the first battery assigned amount interval ①, whereas a function associated with the contact address corresponding to a relatively low battery assigned amount may be limited even if it is a designated contact address in the second battery assigned amount interval ②.

For another example, as illustrated in FIG. 14, the controller 180 may select a second contact address and limit a function based on information on the contact addresses other than the second contact address in the first battery assigned amount interval ①. Furthermore, the controller may select a first contact address and limit a function based on information on the contact addresses other than the first contact address in the second battery assigned amount interval ②.

In other words, the designated contact addresses may be selected in the order of low battery assigned amount to allow a function associated with the contact address. Furthermore, the power consumed to implement the allowed function may correspond to the relevant battery assigned amount.

For example, when battery assigned amounts 10% and 5% are set to the first and the second contact address, respectively, the power corresponding to the first battery assigned amount (5%) may be consumed first to implement a function associated with the second contact address, and then the power corresponding to the second battery assigned amount (10%) may be consumed to implement a function associated with the first contact address.

On the contrary, the designated contact addresses may be selected in the order of high battery assigned amount to allow a function associated with the contact address.

Though not shown in the drawing, a reference value may be determined as a higher value between the first RQ1 and second RQ2 battery assigned amounts. For example, when the first battery assigned amount RQ1 is greater than the second battery assigned amount RQ2 and the battery remaining amount is less than or equal to the first battery assigned amount RQ1, a limited mode may be implemented.

In this case, in an interval in which the battery remaining amount is less than or equal to the first battery assigned amount RQ1 and greater than the second battery assigned amount RQ2, the controller 180 may select both the first and the second contact address, and limit a function based on information on the contact addresses other than the first and the second contact address. Otherwise, in the same interval, the controller 180 may select the second contact address, and limit a function based on information on the other contact addresses other than the second contact address.

Furthermore, in an interval in which the battery remaining amount is less than the second battery assigned amount RQ2, the controller 180 may select the first contact address, and limit a function based on information on the contact addresses other than the first contact address.

As described above, when a limited mode is implemented, the controller 180 may select at least one of the first and the second contact address based on the battery remaining amount, and limit a function based on information on the contact addresses other than the selected contact address. As described above, the battery remaining amount may be repeatedly measured and updated until the battery unit is discharged, and the limited function may vary according to a change of the battery remaining amount.

Figure 15:
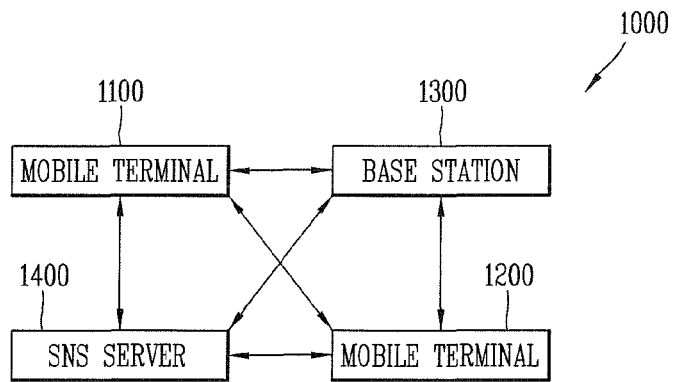
FIG. 15 is a block diagram illustrating a mobile communication system according to an embodiment of the present invention.

FIG. 15 is a block diagram illustrating a mobile communication system 1000 according to an embodiment of the present invention. Referring to FIG. 15, the mobile communication system 1000 may include a first mobile terminal 1100, a second mobile terminal 1200, a base station 1300, and a social network service server 1400 (hereinafter, referred to as an "SNS server"). Here, the SNS server 1400 refers to a server for operating and managing social network services and providing their associated contents.

Hereinafter, for the sake of brevity of explanation, it is assumed that the first mobile terminal 1100 is operated as a calling terminal set to a limited mode, and the second mobile terminal 1200 is operated as a called terminal corresponding to the designated contact address for the limited mode in the first mobile terminal 1100.

When a limited mode is implemented in the first mobile terminal 1100 to generate notification information, the first mobile terminal 1100 may transmit the notification information to at least one of the second mobile terminal 1200, the base station 1300, and the SNS server 1400. The notification information has been described previously, and the detailed description thereof will be omitted.

The second mobile terminal 1200 may receive notification information from at least one of the first mobile terminal 1100, the base station 1300, and the SNS server 1400. For example, the second mobile terminal 1100 may receive notification information from the first mobile terminal 1100 using an e-mail, a messenger application, and the like. Furthermore, the second mobile terminal 1200 may receive a text message containing notification information through a relay of the base station 1300. Furthermore, the second mobile terminal 1200 may receive notification information posted on the SNS server 1400.

The base station 1300 may receive notification information with a predetermined time interval from the first mobile terminal 1100. In other words, the notification information can be synchronized between the first mobile terminal 1100 and the base station 1300.

When the power-off of the first mobile terminal 1100 is detected, the base station 1300 may transmit the synchronized notification information to the second mobile terminal 1200 or the SNS server 1400.

The SNS server 1400 may store and manage notification information transmitted from the first mobile terminal 1100 or the base station 1300. Furthermore, when there is a request for notification information from the second mobile terminal 1200, the SNS server 1400 may transmit notification information to the second mobile terminal.

As described above, according to a mobile terminal 100 according to one embodiment of the present invention, notification information on a power saving mode may be notified to an object corresponding to the designated contact address. Accordingly, a person or government organization that has received notification information from the user's mobile terminal 100 may properly cope with the user's difficulties caused by the power shortage of the mobile terminal.

Figure 16:
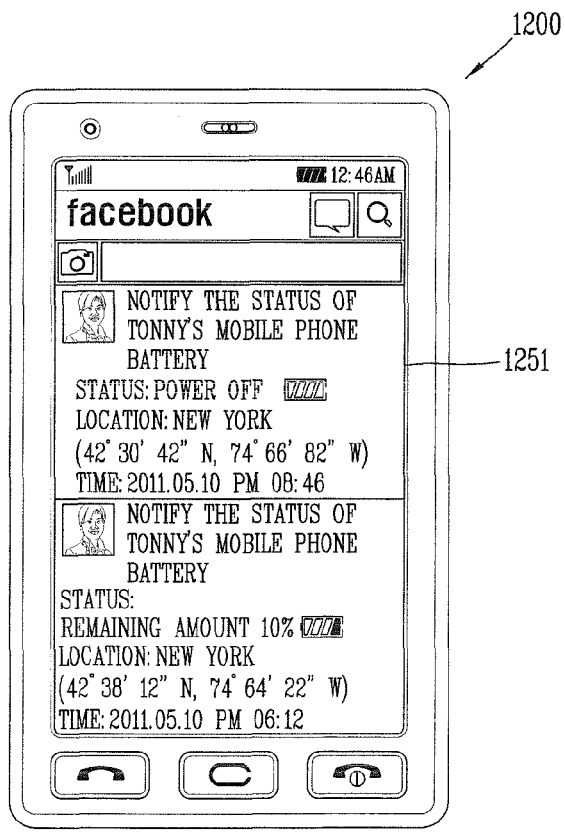
FIGS. 16 and 17 are conceptual views illustrating a user interface of a called terminal displaying notification information for a limited mode generated by a calling terminal illustrated in FIG. 15.
Figure 17:
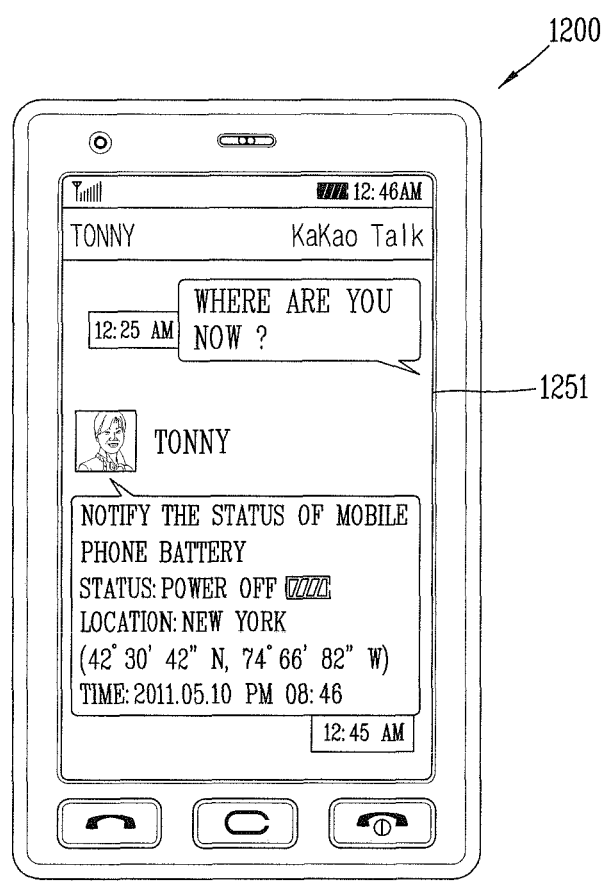

FIGS. 16 and 17 are conceptual views illustrating a user interface of the called terminal 1200 displaying notification information for a limited mode generated by the calling terminal 1100 illustrated in FIG. 15. The name "TONNY" illustrated in the drawing may denote a user of the calling terminal 1100. Accordingly, it is seen that the display unit 1251 of the called terminal 1200 displays the battery status of the calling terminal 1100.

Referring to FIG. 16, the called terminal 1100 may receive notification information posted on the SNS server 1400 (refer to FIG. 15) using an SNS application. The display unit 1251 of the called terminal 1100 may display the received notification information, for example, battery status of the calling terminal 1100, location information, relevant event occurrence time, and the like on the SNS application execution window.

Referring to FIG. 17, the called terminal 1100 may receive notification information through a messenger application. More specifically, when the called terminal 1100 requests chatting using a messenger application, the called terminal 1100 may receive notification information from the calling terminal 1100 in response to the request. The display unit 1251 of the called terminal 1100 may display the received notification information on the messenger application execution window.

As described herein, according to a mobile terminal according to one embodiment of the present invention, a battery assigned amount set to the designated contact address may be compared with a battery remaining amount, and a limited mode (power saving mode) may be carried out according to the result. Furthermore, in the limited mode, a function based on information on an undesignated contact address may be limited, thereby reducing power consumption. In other words, the power resource of the mobile terminal may be preferentially used to implement a function based on information on the contact address of a specific object (for example, friend, family, emergency organization, etc.)

Furthermore, according to a mobile terminal according to one embodiment of the present invention, notification information on a limited mode may be notified to a specific object. Accordingly, a person or government organization that has received notification information from the user's mobile terminal may properly cope with the user's difficulties caused by the power shortage of the mobile terminal.

In addition, when a limited mode is implemented, a menu window for implementing only a function based on information on the designated contact address may be provided. The user may implement a function allowed in the limited mode in a convenient manner using the menu window.

According to an embodiment of the present invention, the foregoing method may be implemented as codes readable by a processor on a medium written by the program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the described embodiments will not be limited to a mobile terminal disclosed herein, and all or part of each embodiment may be selectively combined and configured to make various modifications thereto.

What is claimed is:

1. A mobile terminal, comprising:
   a battery unit configured to supply power to at least one electronic element, the at least one electronic element mounted on a terminal body and performing a plurality of functions based on information related to a plurality of contact addresses;
   a display configured to display information;
   a measurement unit configured to measure a remaining amount of power of the battery unit; and
   a controller configured to:
   designate at least two contact addresses of the plurality of contact addresses;
   assign an amount of supplied power for each of the designated at least two contact addresses;
      implement a limited mode according to a comparison of the measured remaining amount of power to a reference value;
      limit performance of functions related to contact addresses of the plurality of contact addresses other than the designated at least two contact addresses;
      generate first state information for a first user and control the display to display the first state information on-line for the designated at least two contact addresses when a messenger application is executed in the limited mode;
   generate second state information for a second user and control the display to display the second state information off-line for contact addresses other than the designated at least two contact addresses when the messenger application is executed in the limited mode; and
      perform one or more functions related to each of the designated at least two contact addresses, each of the one or more functions performed using only the corresponding assigned amount of supplied power.

2. The mobile terminal of claim 1, further comprising:
   a communication unit configured to transmit notification information related to the implemented limited mode to at least a terminal corresponding to the designated at least two contact addresses, a social network service (SNS) server, or a base station.

3. The mobile terminal of claim 2, wherein the notification information comprises at least battery status information, reply information, or location information.

4. The mobile terminal of claim 3, wherein the reply information comprises at least a phone number of a calling terminal providing the notification information, contact address information corresponding to a terminal adjacent the calling terminal, an address of the SNS server or authentication information for accessing the SNS server.

5. The mobile terminal of claim 2, wherein the communication unit is further configured to receive location information related to a wireless charging region that is discovered in the implemented limited mode.

6. The mobile terminal of claim 5, wherein the controller is further configured to control the display to display the location information and further comprising:
   a power receiver configured to detect the wireless charging region and receive wireless power from a wireless power transmission device corresponding to the wireless charging region; and
   a charging unit configured to charge the battery unit using the received wireless power.

7. The mobile terminal of claim 1, wherein the controller is further configured to control the display to display notification information related to the implemented limited mode.

8. The mobile terminal of claim 1, wherein each of the designated at least two contact addresses comprises at least one emergency contact address specified by each of one or more countries.

9. A mobile terminal, comprising:
   a battery unit configured to supply power to at least one electronic element that is mounted on a terminal body and performs a plurality of functions based on information related to a plurality of contact addresses;
   a display configured to display information;
   a measurement unit configured to measure a remaining amount of power of the battery unit; and a controller configured to:
assign a first amount of supplied power for performing functions of the plurality of functions that are related to a first contact address of the plurality of contact addresses;
   assign a second amount of supplied power for performing functions of the plurality of functions that are related to a second contact address of the plurality of contact addresses;
   implement a limited mode according to a comparison of the measured remaining amount of power to a reference value;
   limit performance of functions of the plurality of functions that are related to contact addresses other than the first and second contact address;
   generate first state information for a first user and control the display to display the first state information on-line for the designated at least two contact addresses while a messenger application is executed in the limited mode;
   generate second state information for a second user and control the display to display the second state information off-line for contact addresses other than the designated at least two contact addresses when the messenger application is executed in the limited mode; and
   perform one or more functions related to each of the first and second contact address using only the corresponding first or second assigned amount of supplied power.

10. A method of operating a mobile terminal, the method comprising:
   supplying power to at least one electronic element that is mounted on a terminal body and performs a plurality of functions based on information related to a plurality of contact addresses;
   measuring a remaining amount of power of a battery unit;
   designating at least two contact addresses of the plurality of contact addresses;
assigning an amount of supplied power for each of the designated at least two contact addresses;
   implementing a limited mode according to a comparison of the measured remaining amount of power to a reference value;
   limiting performance of functions related to contact addresses of the plurality of contact addresses other than the designated at least two contact addresses;
   generating first state information for a first user and displaying the first state information on-line for the designated at least two contact addresses when the messenger application is executed in the limited mode; and
   generating second state information for a second user and displaying the second state information off-line for contact addresses other than the designated at least two contact addresses when the messenger application is executed in the limited mode; and
   performing one or more functions related to each of the designated at least two contact addresses, each of the one or more functions performed using only the corresponding assigned amount of supplied power.

11. The method of claim 10, further comprising transmitting notification information related to the implemented limited mode to at least a terminal corresponding to the designated at least two contact addresses, a social network service (SNS) server, or a base station.

12. A method of operating a mobile terminal, the method comprising:
   supplying power to at least one electronic element that is mounted on a terminal body and performs a plurality of functions based on information related to a plurality of contact addresses;
   measuring a remaining amount of power of a battery unit;
assigning a first amount of supplied power for performing functions of the plurality of functions that are related to a first contact address of the plurality of contact addresses;
   assigning a second amount of supplied power for performing functions of the plurality of functions that are related to a second contact address of the plurality of contact addresses;
   implementing a limited mode according to a comparison of the measured remaining amount of power to a reference value;
   limiting performance of functions of the plurality of functions that are related to contact addresses other than the first and second contact address;
   generating first state information for a first user and displaying the first state information on-line for the designated at least two contact addresses while a messenger application is executed in the limited mode; and
   generating second state information for a second user and displaying the second state information off-line for contact addresses other than the designated at least two contact addresses when the messenger application is executed in the limited mode; and
   performing one or more functions related to each of the first and second contact address using only the corresponding assigned first or second amount of supplied power.

13. The mobile terminal of claim 9, further comprising a communication unit configured to transmit notification information indicating that the controller blocks execution of functions corresponding to contact addresses other than the first and second contact address in the limited mode.

* * * * *